(12) United States Patent
Gasparini et al.

(10) Patent No.: US 7,581,695 B2
(45) Date of Patent: Sep. 1, 2009

(54) AIRCRAFT WITH A MODIFIED GEAR, AND METHOD OF PRODUCING THE GEAR

(75) Inventors: Giuseppe Gasparini, Gallarate (IT); Sergio Sartori, Milan (IT); Nihat Yildirim, Gaziantep (TR)

(73) Assignee: Agusta S.p.A., Samarate (IT)

( * ) Notice: Subject to any disclaimer, the term of this patent is extended or adjusted under 35 U.S.C. 154(b) by 0 days.

(21) Appl. No.: 11/964,877

(22) Filed: Dec. 27, 2007

(65) Prior Publication Data
US 2008/0173767 A1    Jul. 24, 2008

(30) Foreign Application Priority Data
Dec. 29, 2006   (EP) .................................. 06425878

(51) Int. Cl.
*B64D 35/00* (2006.01)
(52) U.S. Cl. ................. 244/60; 74/15.82; 74/15.84; 74/15.86; 74/415; 74/462; 74/464
(58) Field of Classification Search ............. 244/60; 74/15.63, 15.82, 15.84, 15.86, 52, 640, 412 R, 74/415, 457, 462, 464; 181/371, 372
See application file for complete search history.

(56) References Cited
U.S. PATENT DOCUMENTS
5,797,185 A * 8/1998 Sammataro et al. ........ 29/893.3

FOREIGN PATENT DOCUMENTS
JP          5-340463          12/1993
WO       WO 93/18320          9/1993

* cited by examiner

*Primary Examiner*—J. Woodrow Eldred
(74) *Attorney, Agent, or Firm*—Berenato, White & Stavish, LLC

(57) ABSTRACT

There is described a helicopter having a transmission for transmitting motion from a driving member to a driven member; the transmission has at least a first gear driven by the driving member, and a second gear meshing with the first gear and in turn driving the driven member; the first and second gear have teeth shaped so that the gears mesh with one another at at least two pairs of respective simultaneously meshing teeth; the teeth of at least one of the gears have a profile having an end portion relieved with respect to a starting theoretical involute; and the pattern of the distance between the points of the end portion and the starting involute along an axis of the tooth has at least a first and a second segment sloping with respect to each other.

8 Claims, 6 Drawing Sheets

AIRCRAFT WITH A MODIFIED GEAR, AND METHOD OF PRODUCING THE GEAR

This Application is a U.S. Patent Application which claims priority under 35 USC 119 to European Patent Application No. 06425878.3 filed Dec. 29, 2006 in Europe, which is hereby incorporated by reference in its entirety.

The present invention relates to an aircraft with a modified gear, and to a method of producing the gear.

In particular, the present invention relates to a helicopter, to which the following description refers purely by way of example without loosing its general sense.

BACKGROUND OF THE INVENTION

As is known, helicopters normally comprise a number of transmissions for transmitting motion from one or more turbines to the main rotor and/or tail rotor, and/or from the turbine to a number of accessory devices, i.e. for supplying energy, for example, by which to power the on-board equipment.

More specifically, transmissions are known comprising a number of gears, which mesh with one another by means of respective teeth to transmit a desired power value.

In known manner, the teeth of each gear have an involute profile to optimize power transmission and reduce the noise level of the transmission.

In operating conditions, the profiles of the meshing teeth on the gears deviate from the theoretical involute configuration, on account of the geometric and dimensional tolerances and deformation under stress of the teeth.

As a result, the actual position of the meshing teeth deviates from the theoretical position the teeth would have if they had no geometric or dimensional tolerances, and if the profile were undeformed under stress.

Which deviation is due to the elasticity and configuration of the profile of the teeth meshing at the time, and therefore varies during operation of the gears, even with no change in the power transmitted by the gears.

Such deviations produce noise and vibration which, as observed by the Applicant, are not uniform alongside variations in the power transmitted by the gears.

SUMMARY OF THE INVENTION

It is an object of the present invention to provide an aircraft designed to reduce the noise and vibration levels of such transmissions within a wide range of power values while optimizing their mechanical strength.

According to the present invention, there is provided an aircraft as claimed in the attached Claims.

The present invention also relates to a method of producing an aircraft gear, as claimed in the attached Claims.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
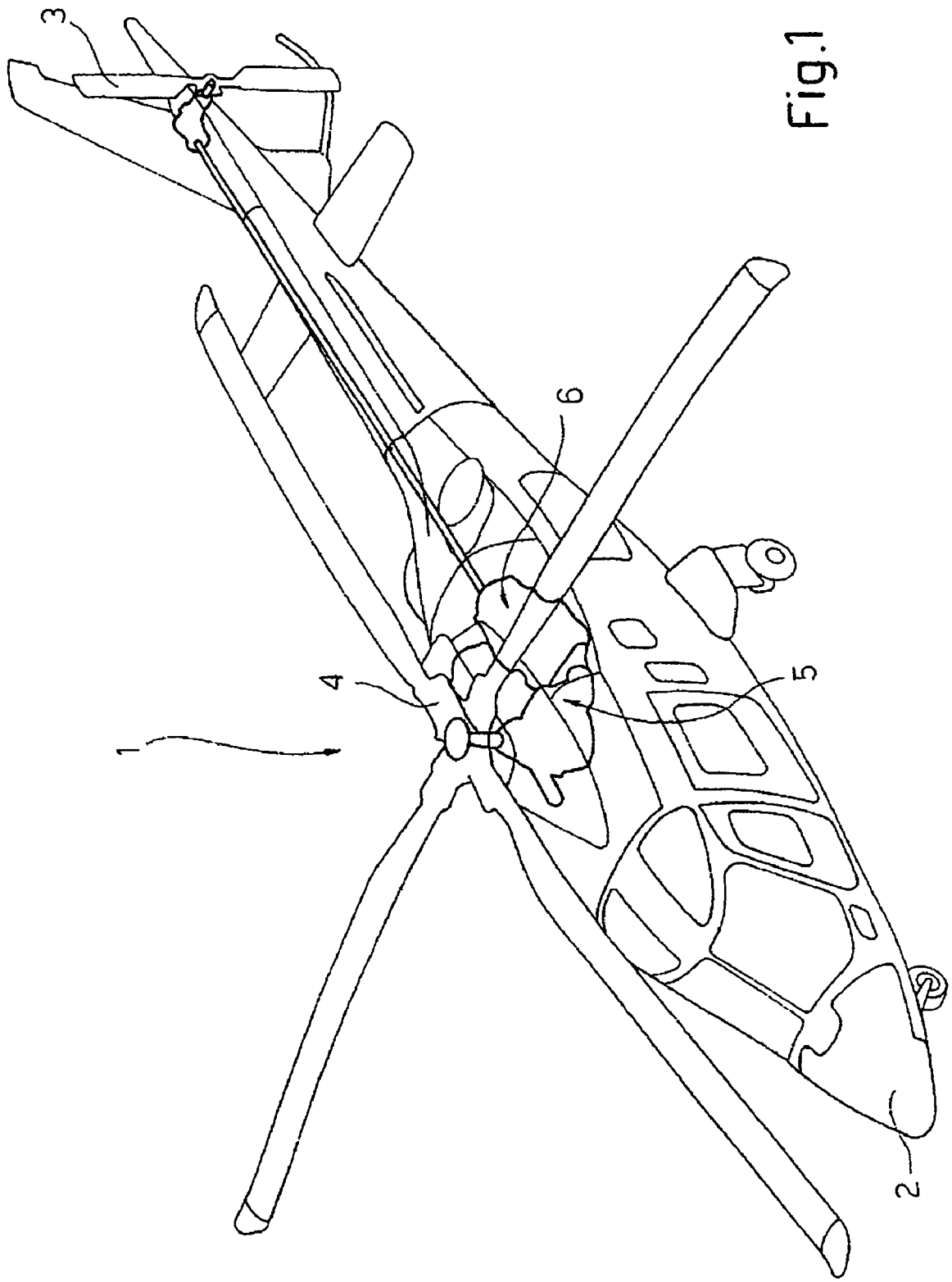
FIG. 1 shows a view in perspective of a helicopter in accordance with the present invention.

Number 1 in FIG. 1 indicates an aircraft, in particular a helicopter, substantially comprising a fuselage 2; a main rotor 4 mounted on fuselage 2 to rotate in a first plane to sustain the helicopter 1 as a whole; and a tail rotor 3 located at one end of fuselage 2. More specifically, rotor 3 rotates in a second plane crosswise to the first to counteract the rotation torque generated by rotor 4 on fuselage 2.

Helicopter 1 also comprises a main transmission 5 for transmitting motion from an auxiliary transmission (FIG. 2), in turn driven by a turbine 6 and driving the rotor 3, to the rotor 4.

Helicopter 1 comprises a number of further auxiliary transmissions (not shown) driven by transmission 5 and in turn driving accessory members (not shown) of helicopter 1.

Figure 2:
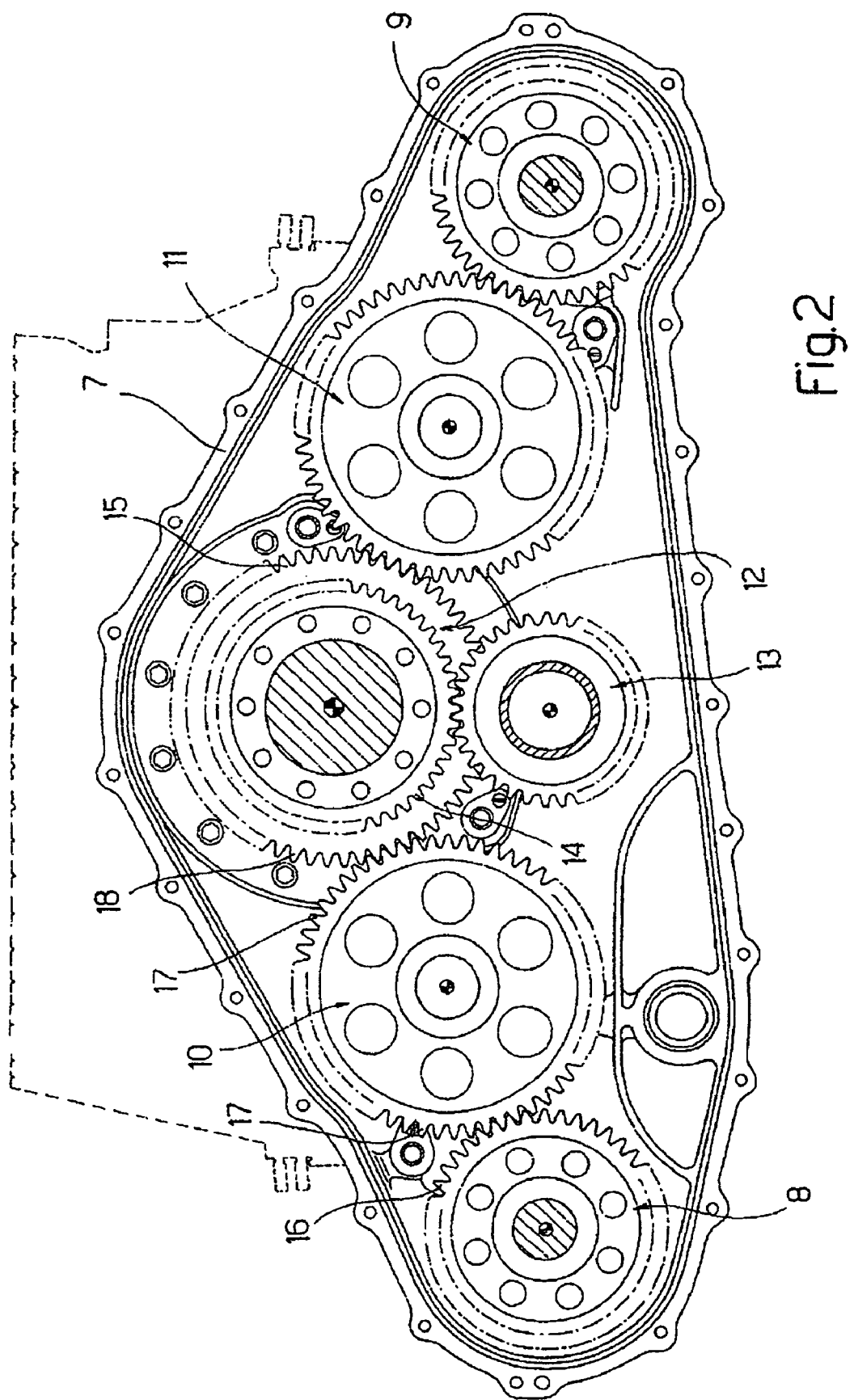
FIG. 2 shows a larger-scale cross section of a transmission of the FIG. 1 helicopter.
Figure 3:
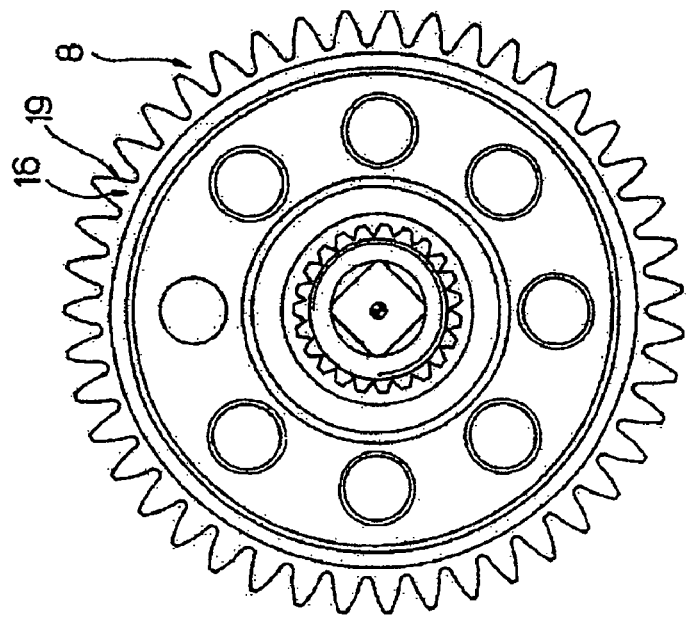
FIG. 3 shows a half axial section of a gear of the FIG. 2 transmission.
Figure 4:
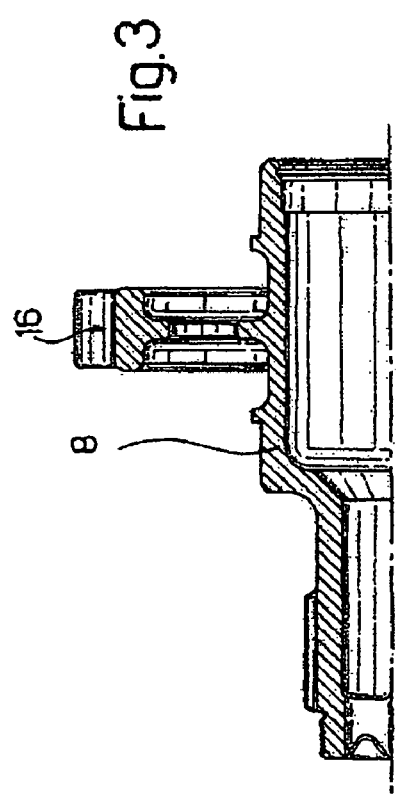
FIG. 4 shows a frontal view of the FIG. 3 gear.

With particular reference to FIG. 2, one of said auxiliary transmissions comprises a casing 7; a gear 8 and a gear 9 (also shown in FIGS. 3 and 4) housed inside casing 7 and connected operatively (in a manner not shown) to two distinct driving member; a gear 12 housed inside casing 7 and meshing with a gear 13, in turn, connected with a driven member not shown.

The auxiliary transmission also comprises a train of gears 10, 11 housed inside casing 7 and both meshing with gear 12. Gears 10, 11 also mesh with gears 8, 9 for transmitting the motion to the gear 12.

More specifically, gear 10 is driven by gear 8 and in turn drives gear 12.

Gear 10 is therefore an idler gear for ensuring gears 8, 12 rotate in the same direction.

Gear 12 has teeth 15 meshing on opposite sides with gear 10 and gear 11; and teeth 14 meshing with gear 13. Teeth 15 are located radially outwards with respect to teeth 14 and to an axis of gear 12.

In a completely analogous manner with respect to gear 10, gear 11 is driven by gear 9 and drives gear 12.

Gear 11 is therefore an idler gear for ensuring that gears 9, 12 rotate in the same direction.

Gears 8, 9, 10, 11, 12, 13 have straight teeth, and are fitted to respective shafts parallel to one another.

Advantageously, gear 8 has at least two teeth 16 (only one indicated in FIG. 2) meshing simultaneously with two corresponding teeth 17 (only one indicated in FIG. 2) of gear 10, and gear 10 has two further teeth 17 (only one indicated in FIG. 2) meshing simultaneously with two corresponding teeth 18 (only one indicated in FIG. 2) of gear 12. Each tooth 16, 17, 18 has a profile 19 (shown in FIG. 5 relative to tooth 16, and in FIG. 6 relative to teeth 16, 17) having an end portion 21 (only shown in FIG. 6 relative to tooth 16) relieved with respect to a starting theoretical involute E. The distance pattern (shown in FIG. 6 relative to tooth 16) between the points of end portion 21 and involute E along the axis A of tooth 16, 17, 18 is defined by a broken line formed by two segments B, C sloping with respect to each other.

Figure 5:
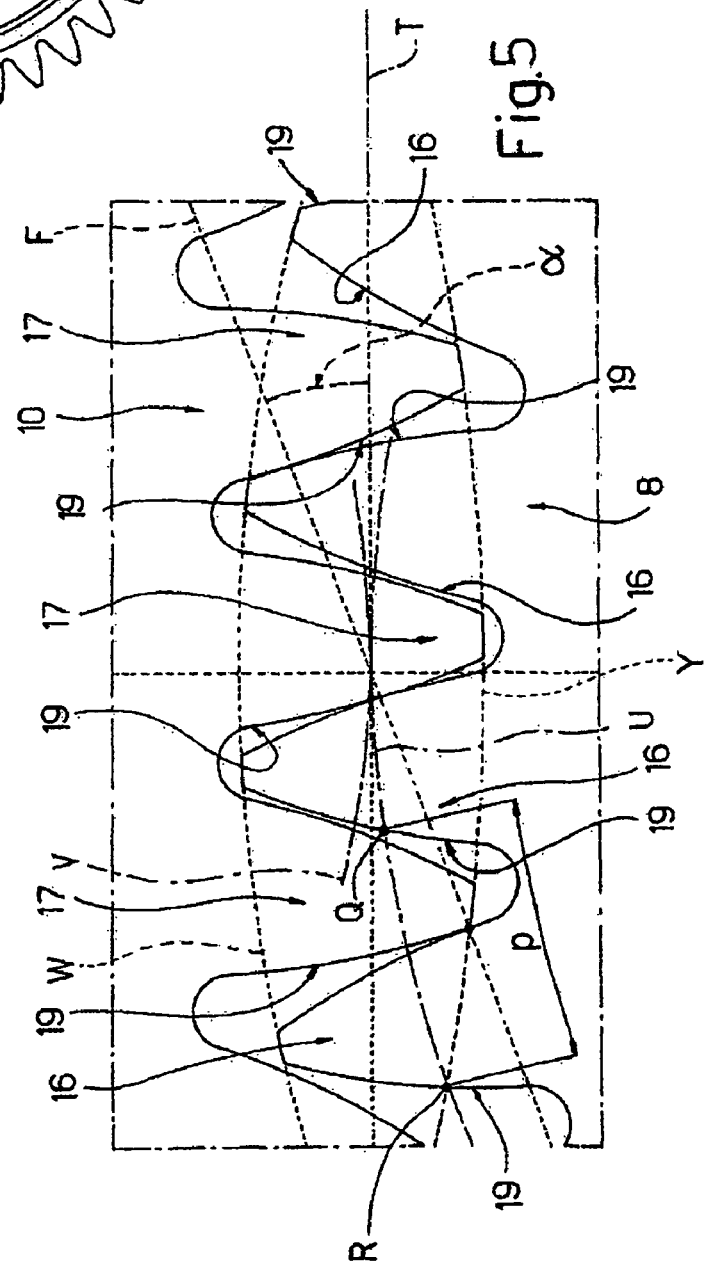
FIG. 5 shows larger-scale details of FIG. 2.

As shown in FIG. 5, gears B and 10, being designed for a contact ratio of over 2, have at least two pairs of teeth 16, 17 meshing simultaneously with each other.

With reference to FIG. 5, the term "contact ratio" refers to the ratio of the length of the contact arc to the circular pitch p of gears 8, 10.

More specifically, the contact arc is the arc, measured along the pitch circle U of gear 8, between the two points of intersection between the pressure line F and respective outer circles W, Y of gears 8, 10. As is known, the pressure line F is the line along which the teeth 16, 17 of gears 8, 10 exchange reciprocal action and reaction forces. Pressure line F slopes by a pressure angle α with respect to a tangent T common to the pitch circles U, V of gears 8, 10.

The circular pitch p, on the other hand, refers to the distance between two corresponding points R, Q measured along the pitch circle U of gear 8.

With particular reference to gears 8, 10, the macro-geometrical parameters of meshing, with regard to the pressure angle α and to the ratio between addendum and tooth height, have been defined so that gears 8, 10 show high contact ratio, i.e. the contact ratio is greater than 2 and practically assumes a value between 2.2 and 2.4.

Meshing of gears 12 and 10 is identical to that of gears 8 and 10, and therefore not described in detail.

Very briefly, gear 12 has at least two teeth 18 meshing simultaneously with two corresponding teeth 17 of gear 10.

Similarly, meshing of gears 9 and 11 and of gears 11 and 12 is identical to that of gears 8 and 10 and therefore not described in detail.

Figure 6:
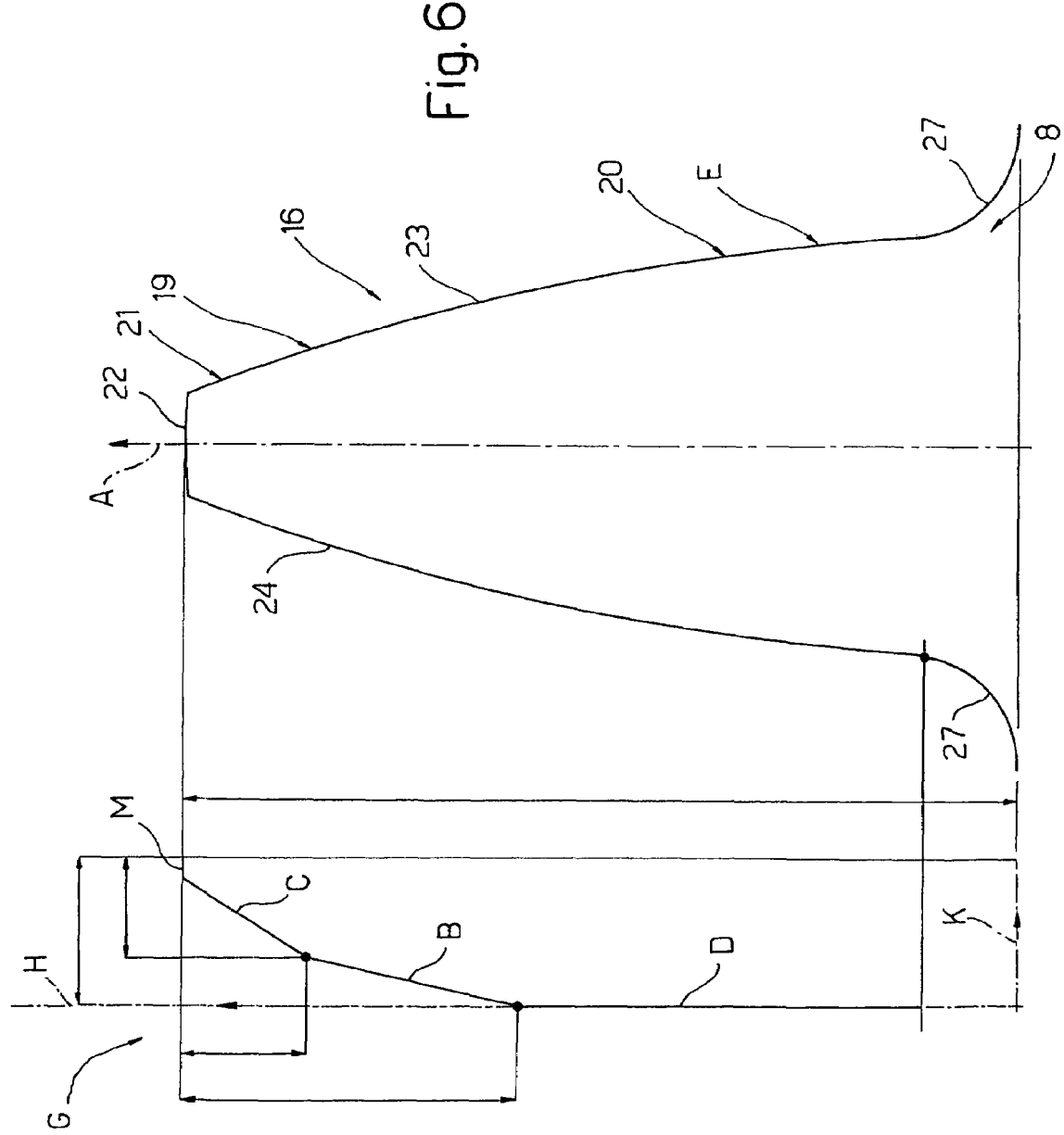
FIG. 6 shows a larger-scale view of a tooth of the FIG. 3 gear, and the deviation pattern of the profile of the tooth from an involute theoretic profile.

As shown on the right in FIG. 6, in addition to end portion 21, profile 19 of tooth 16 also comprises a root portion 20 shaped in the form of involute E, which represents the unmodified portion of the active flank.

More specifically, root portion 20 of each tooth 16 projects from gear 8 at two fillets 27 defining the root of tooth 16, and is contiguous to end portion 21 at the opposite end to fillets 27.

More specifically, fillets 27 extend symmetrically with respect to, and on opposite sides of, axis A.

End portion 21 of tooth 16 defines a free end 22 of tooth 16, at the opposite end to the axis (not shown) of gear 8.

The letter G on the left in FIG. 6 indicates a graph of the distance pattern between the points of profile 19 of tooth 16 and involute E as a function of the position of said points along axis A. More specifically, the distance between the points of profile 19 and involute E is indicated by a horizontal axis K, and the position of said points along axis A is indicated by a vertical axis H.

Axis H is oriented to indicate values increasing along axis A from fillets 27 to end 22.

It is important to note that said distance is microgeometric and, in particular, is measured in microns or tens of microns.

Figure 7:
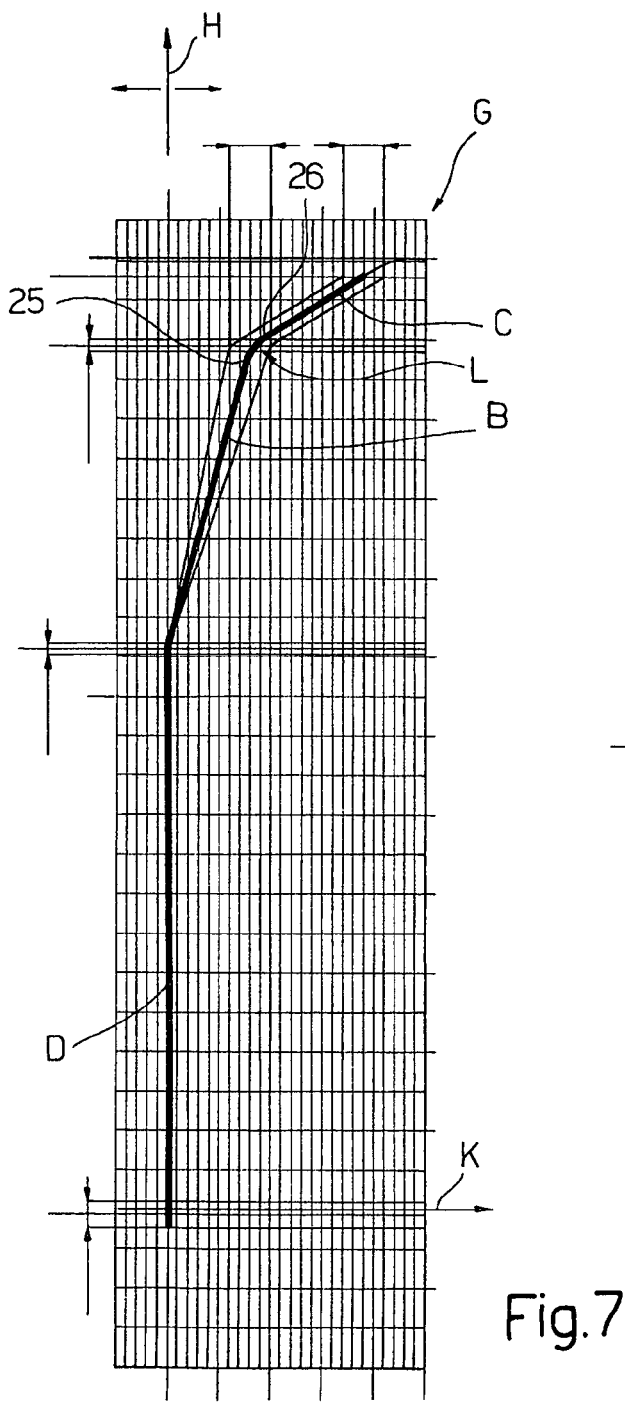
FIG. 7 shows a profile chart of the FIG. 6 tooth.
Figure 8:
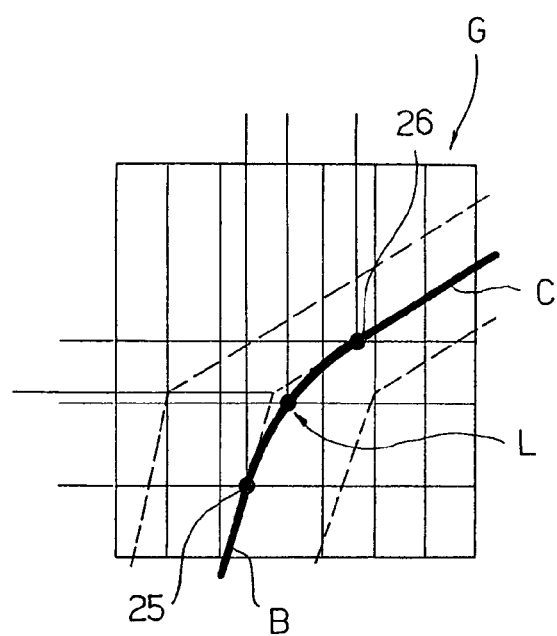
FIG. 8 shows larger-scale details of FIG. 7.

Graph G is used to describe punctually the tip modification (FIGS. 7 and 8), i.e. to generate a chart showing, for each point of profile 19, the amount of material to be removed from theoretical involute E.

More specifically, each point of profile 19 is associated with a respective point on graph G, and the respective amount of material to be removed from involute E corresponds to the distance of said point on graph G from axis H.

More specifically, graph G comprises a portion D and segments B, C.

More specifically, the points of root portion 20 having unmodified active flank correspond to portion D. And, since root portion 20 is shaped in the form of the starting involute E, portion D is superimposed on axis H.

Segment B corresponds to the points of a portion 23 of end portion 21 adjacent to root portion 20, and segment C corresponds to the points of a portion 24 interposed, along axis A, between end 22 and portion 23.

The slope angle of segment B with respect to axis H is smaller than the slope angle of segment C with respect to axis H, so that the distance between portion 23 and the starting involute E increases, with respect to axis A, less sharply than the distance between portion 24 and the starting involute E with respect to axis A.

In other words, the angular coefficient of segment B with respect to a variable indicated by axis H is less than the angular coefficient of segment C with respect to said variable.

The distance pattern between end portion 21 and involute E is also defined by a curved portion L (only shown in FIG. 8) interposed between segments B, C.

More specifically, curved portion L has one end 25 connected to segment B, and one end 26 opposite end 25 and connected to segment C.

The distance between end portion 21 and the starting involute E increases at curved portion L to a greater extent than at segment B, and to a lesser extent than at segment C.

In other words, the point derivative of end portion 21 with respect to a variable indicated by axis H ranges between the angular coefficient of segment B and the angular coefficient of segment C.

End portion 21 is shaped so that profile 19 of tooth 16 is represented, at both root portion 20 and end portion 21, by a curve having continuous upper derivatives.

Graph G also comprises a portion M extending parallel to axis K and corresponding to the points of end 22 of tooth 16.

Teeth 17, 18 of gears 10, 12 being similar to and obtained in the same way as teeth 16 of gear 8, neither teeth 17, 18 nor respective profiles 19 are described in detail below.

Similarly, the teeth of gears 9, 11 are similar to and obtained in the same way as teeth 16 of gear 8 and teeth 17 of gear 10.

Therefore, neither the teeth of gears 9, 11 nor the respective profiles are described in detail below.

As known, gears tip modifications optimize the meshing quality of the gears under load. To evaluate the effectiveness of such modifications, a comparison graph is shown in FIG. 9.

Figure 9:
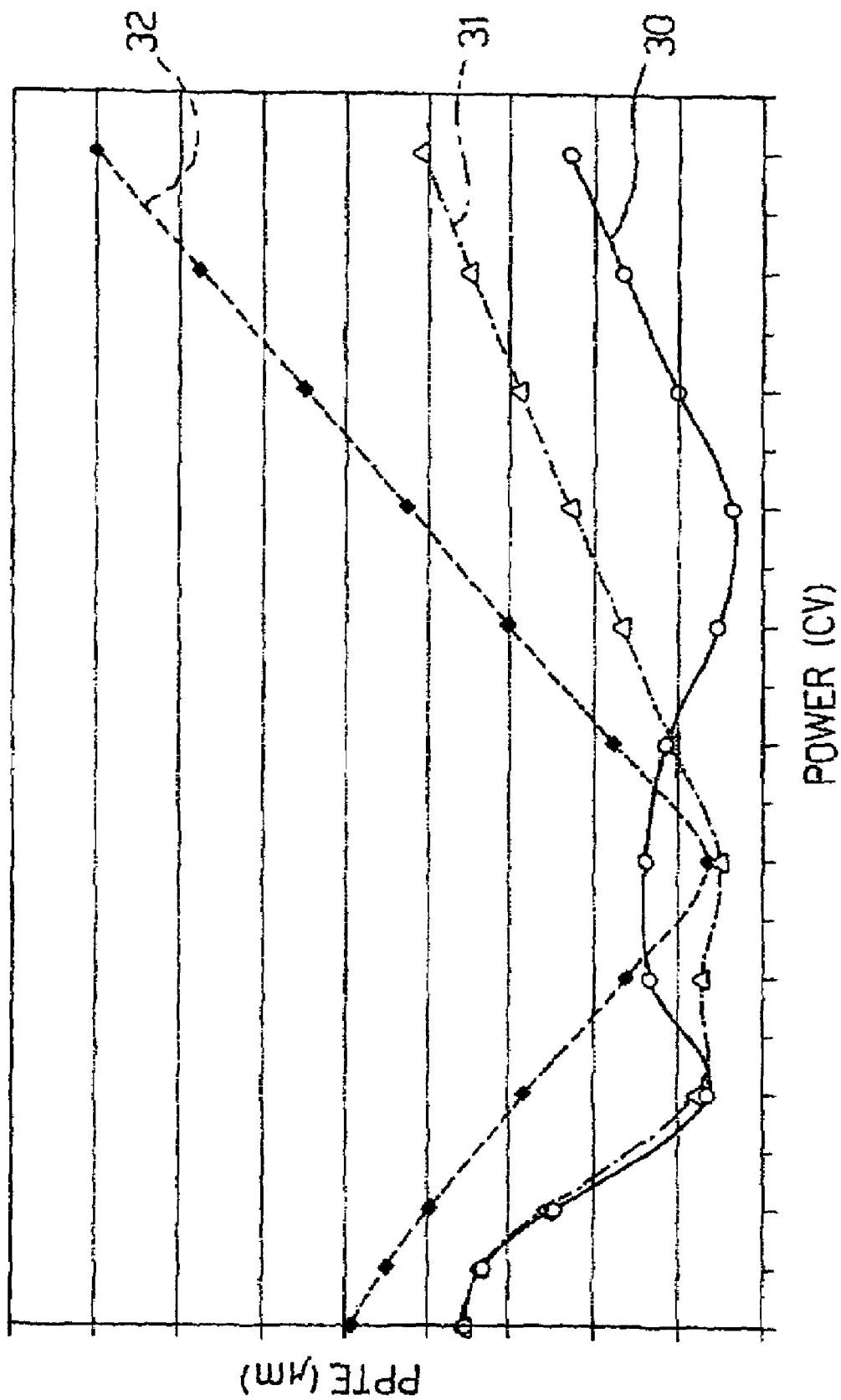
FIG. 9 shows a graph of the peak-to-peak transmission error, alongside variations in power output, of a FIG. 1 helicopter transmission and other transmissions.

The continuous line 30 in FIG. 9 shows the so-called "peak-to-peak transmission error" of teeth 16, 17 alongside variations in power transmission.

The term "transmission error" refers to the linear deviation between the real position of each tooth 17, for a fixed value of rotation of teeth 16 of gear 8, and the theoretical position it would have if motion were transmitted kinematically perfectly.

Which deviation substantially depends on the elasticity and the geometric and dimensional tolerances of teeth 16, 17.

Said theoretical position is evaluated with reference to teeth having perfectly involute profiles even under stress, i.e. infinitely rigid teeth with no geometric or dimensional tolerances of teeth 16, 17.

The term "peak-to-peak transmission error" refers to the absolute value of the difference between the maximum and minimum said linear deviations of teeth 16, during the entire meshing arc.

FIG. 9 also applies, as described above, to teeth 17, 18 of gears 10, 12 and to the teeth of gears 9, 11.

The dot-and-dash line 31 in FIG. 9 indicates the peak-to-peak transmission error of gears having teeth with a contact ratio of over 2 and with a profile relieved with respect to a starting involute. More specifically, said profile is relieved to achieve an unique segment distance pattern between the points of the profile and the starting involute. Such profile is re-called in the following of the present description as linearly relieved involute.

The entity of such tip modification is the result of a process of optimization directed to improve the behavior under load of the meshing between gears 8, 10, selecting as starting point for the tip modification the diameter corresponding to the passage between a triple inner contact (three couples of teeth simultaneously meshing each one another) and a double inner contact (two couples of teeth simultaneously meshing one another). Such linear modification is known as long modification.

The dash line 32 in FIG. 9 indicates the peak-to-peak transmission error of gears having teeth with a linearly relieved involute profile but with a contact ratio of less than 2.

Analogously to the previous case, the entity of such modification has been also determined by an optimization process, under the hypothesis of a long modification.

As shown in FIG. 9, the peak-to-peak transmission error of teeth 16 of gear 8 is less than that of the other gear teeth for particularly low and high power transmission values, and is comparable with that of the other gear teeth for intermediate power transmission values.

The advantages of helicopter 1 and the method according to the present invention will be clear from the foregoing description.

In particular, the relieved-involute shape of end portion 21 of teeth 16, 17, 18, and the fact that gears 10, 12 and 12, 14 have more than two teeth 16, 17 and 17, 18 meshing simultaneously, provide for reducing the peak-to-peak transmission error over a wide range of power transmission values, as compared with teeth having a linearly relieved-involute profile and a contact ratio of less than two.

A meshing of high quality is therefore ensured over a wide range of power required by the helicopter 1.

More specifically, as shown in FIG. 9, the peak-to-peak transmission error of gear 8 at very low or very high power transmission values is less than that (indicated by line 32) of a gear with a contact ratio of less than two, and teeth with a linearly relieved-involute profile.

As also shown in FIG. 9, the peak-to-peak transmission error of gear 8 at intermediate power transmission values is comparable with that of gears with a contact ratio of less than two, and teeth with a linearly relieved-involute profile.

In other words, at intermediate power transmission values, end portion 21 in the form of a relieved involute E, and the contact ratio of over two, substantially compensate for deviations (indicated by line 32 in FIG. 9) induced by the geometric and dimensional tolerances of teeth with a contact ratio of less than two, and a linearly relieved-involute profile.

On the other hand, at very low or very high power transmission values, end portion 21 in the form of a relieved involute E, and the contact ratio of over two, reduce deviations (indicated by line 32 in FIG. 9) induced by the geometric and dimensional tolerances of teeth with a linearly relieved-involute profile.

Consequently, noise and vibration produced by the actual position of the meshing teeth deviating from the theoretical position are reduced over a wide range of power transmission values.

The advantage of such tip modification results also in the optimization of tooth root flexural stresses, which affect gears during the normal application of the mission load. Such reduction, dependent directly on the definition of the geometric features of the profile 19, can be quantified as a net gain of strength, with a reduction of strains greater than 25%.

Clearly, changes may be made to helicopter 1 and the method as described and illustrated herein without, however, departing from the protective scope defined in the accompanying Claims.

In particular, gears 8, 9, 10, 11, 12, 13 may form part of transmission 5 or any other auxiliary transmission of helicopter 1.

Moreover, gears 8, 9, 10, 11, 12, 13 may be advantageously applied on other types of aircrafts, such as aeroplanes or convertiplanes.

The invention claimed is:

1. An aircraft (1) comprising:
    a transmission (5) for transmitting motion from a driving member to a driven member;
    said transmission (5) comprising a first gear (8; 10) driven by said driving member and a second gear (10; 12) meshing with said first gear (8; 10) and in turn driving said driven member;
    each of said first and said second gears (8, 10; 10, 12) having teeth (16, 17, 18) shaped so that said first and second gears (8, 10) mesh with one another at at least two pairs of respective simultaneously meshing teeth (16, 17; 17, 18);
    each of said teeth (16, 17, 18) of at least one of said first and second gears (8, 10, 12) has a profile (19) comprising a root portion (20) in the form of a starting theoretical involute (E) and an end portion (21) relieved with respect to said starting theoretical involute (E);
    a pattern (G) of the distance between the points of said end portion (21) and said starting theoretical involute (E) along an axis (A, H) of said tooth (16, 17, 18) comprising at least a first segment (B) and a second segment (C) sloping with respect to each other and with respect to said starting theoretical involute (E).

2. The aircraft as claimed in claim 1, wherein said distance increases along said axis (A, H) from a root (27) of said tooth (16, 17, 18) to a free end (22) of said tooth (16, 17, 18).

3. The aircraft as claimed in claim 2, wherein said first segment (B) slopes less than said second segment (C) with respect to said axis (A, H); and in that said first segment (B) precedes said second segment (C) along said axis (A, H) from said root to said free end (22) of said tooth (16, 17, 18).

4. The aircraft as claimed in claim 1, wherein said pattern (G) comprises a curved portion (L) interposed between said first and said second segment (B, C).

5. The aircraft as claimed in claim 4, wherein a slope, with respect to said axis (A, H), of a driven tangent at each point of said curved portion (L) ranges between said slope of said first segment (B) and said slope of said second segment (C) with respect to said axis (A, H).

6. The aircraft as claimed in claim 1, wherein said first and said second gear (8, 10) mesh with each other at a pressure angle ($\alpha$) of less than twenty degrees.

7. A method of producing a gear (8, 10, 12) for an aircraft (1), comprising the steps of:
    generating a gear (8) comprising a number of teeth (16), each having an outer involute profile (E); said teeth (16) being shaped so that at least two said teeth (16) of said gear (8) mesh with a further gear (10); and
    removing material from an end portion (21) of each said tooth (16) to impart to said end portion (21) a profile in the form of a relieved involute (E);
    said end portion (21) being shaped so that a pattern (G) of the distance between the points of said end portion (21) and said involute (E) comprises at least a first and a second segment (B, C) sloping with respect to each other and with respect to said involute (E).

8. The method as claimed in claim 7, wherein said step of removing material shapes said profile (19) so that said pattern (G) comprises a curved portion (L) interposed between said first and said second segment (B, C).

* * * * *